(12) United States Patent
Triplett et al.

(10) Patent No.: US 8,593,691 B2
(45) Date of Patent: Nov. 26, 2013

(54) METHOD FOR ACHIEVING HIGHER BIT DEPTH IN TAGGED IMAGE PATHS

(75) Inventors: Roger L. Triplett, Penfield, NY (US); Stuart A. Schweid, Pittsford, NY (US); David J. Lieberman, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 471 days.

(21) Appl. No.: 12/949,443

(22) Filed: Nov. 18, 2010

(65) Prior Publication Data
US 2012/0127533 A1    May 24, 2012

(51) Int. Cl.
*G06K 15/00* (2006.01)
(52) U.S. Cl.
USPC ........ 358/3.06; 358/3.07; 358/3.08; 358/3.09
(58) Field of Classification Search
None
See application file for complete search history.

(56) References Cited

U.S. PATENT DOCUMENTS

| | | | | |
|---|---|---|---|---|
| 7,233,339 | B2* | 6/2007 | Bae et al. | 345/596 |
| 2005/0259871 | A1* | 11/2005 | Li et al. | 382/173 |
| 2007/0058203 | A1* | 3/2007 | Pellar | 358/3.13 |
| 2007/0103731 | A1* | 5/2007 | Tse et al. | 358/3.27 |
| 2008/0055651 | A1* | 3/2008 | Wei | 358/3.13 |
| 2009/0034847 | A1* | 2/2009 | Hirohata et al. | 382/190 |

* cited by examiner

*Primary Examiner* — Benny Q Tieu
*Assistant Examiner* — Haris Sabah
(74) *Attorney, Agent, or Firm* — Michael J. Nickerson; Basch & Nickerson LLP

(57) ABSTRACT

A method adapts image data using more than eight bits per pixel to be compatible with devices using only 8-bit per pixel data. The method separates the higher bit depth data into an 8-bit image data stream, the balance of the bits are carried in a separate tag data stream. The 8-bit image data stream can be used in legacy devices that can handle only 8-bit data, and the tag data stream can be used in legacy devices that incorporate a tag data stream for their internal image processing.

17 Claims, 4 Drawing Sheets

|  | 10 bit Image Value (Dec) | 10 Bit Image Value (Hex) | 8 bit image value after invert (Hex) |
|---|---|---|---|
|  | 254 | 0x0FE | 0xFE |
| 308 | 255 | 0x0FF | 0xFF |
|  | 256 | 0x100 | 0xFF |
|  | 257 | 0x101 | 0xFE |
|  | .... |  |  |
|  | 510 | 0x1FE | 0x02 |
| 310 | 511 | 0x1FF | 0x01 |
|  | 512 | 0x200 | 0x00 |
|  | 513 | 0x201 | 0x01 |
|  | .... |  |  |
| 312 | 1022 | 0x2FE | 0xFE |
|  | 1023 | 0x2FF | 0xFF |
|  | 1024 | 0x300 | 0xFF |
|  | 302 | 304 | 306 |

Figure 3

METHOD FOR ACHIEVING HIGHER BIT DEPTH IN TAGGED IMAGE PATHS

BACKGROUND AND SUMMARY

Digital reprographic machines have traditionally been designed using eight bits for the image data. As print quality requirements for the output of these reprographic machines have grown, especially for color reprographics, a variety of methods have been used to increase the quality; however the image path bit width has remained constant.

Newer technologies use image data paths with more than eight bits. However, it would be desirable to be able to transmit and process the data from the wider bit image data paths on older, legacy, machines.

One conventional approach used N-bit to 8-bit error diffusion to get the effect of more than eight bits. While such a technique produced some increase in image quality, it also increased the graininess of the error diffused image.

For many of the older 8-bit data path machines, the image data path included a tag bit path in parallel with the image data path. The tag bit path was used to convey extra information about the corresponding image data word that could be used to chose between alternate processing methods along the image path. For example, the tag bit word could be used to choose between one of several different halftoning schemes. The tag bits and the image bits are separate streams conveying different information.

While the design of the machines using a tag bit path does not allow using the tag bits to directly contain image data, it would be useful to be able to use the tag bits to expand the effective number of bits to allow the legacy machines to accept data from a newer N-bit image source, where N is greater than the original eight bits that the image path was designed for.

BRIEF DESCRIPTION OF THE DRAWING

The drawings are only for purposes of illustrating various embodiments and are not to be construed as limiting, wherein:

FIG. 3 shows in tabular form the transitional values for a data stream;

DETAILED DESCRIPTION

Figure 1:
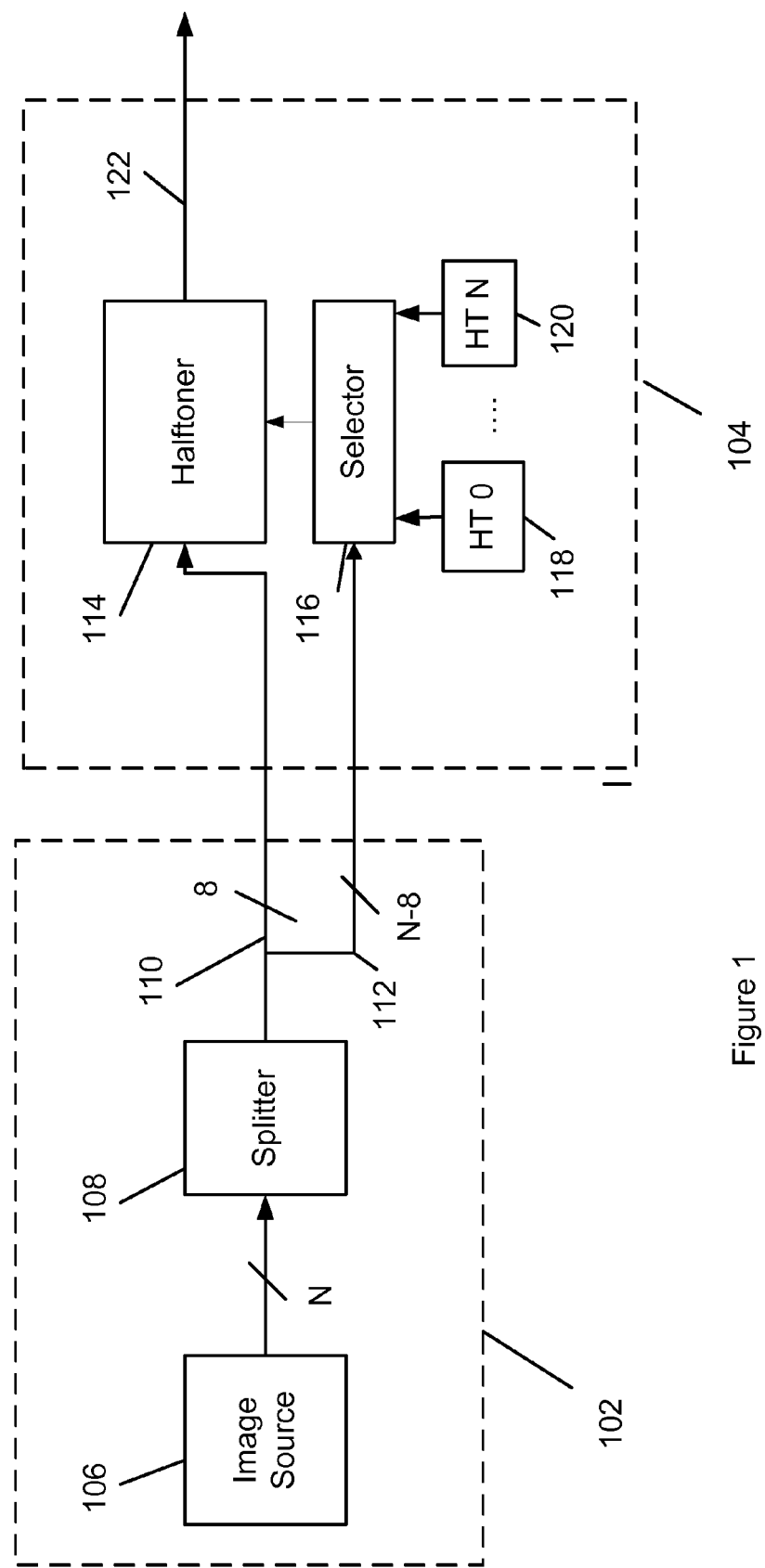
FIG. 1 illustrates an apparatus for converting N-bit image data into 8-bit image and $2^{N-8}$ bit tag data.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

The diagram of FIG. 1 shows an apparatus to separate N-bit image data into two separate streams: (N-8) bits of tag data and eight bits of image data. The eight bits of image data provide a reduced bit depth image that is backwards compatible with a legacy system that contains an 8-bit image path.

At the image generation point, 102, the N-bit data from the image source 106 is split into two separate data streams. The eight most significant (MSB) bits, 110, are separated from the (N-8) least significant bits (LSB), 112, in splitter 108. The source of the image might be a scanner that generates image data from a scan of a hardcopy document, or, for example, the source might be the output of a program that generates image data from a source of page description language.

By using the eight most significant bits as the image data stream, the legacy receiving device, 104, can print using only the eight separated bits. For some legacy devices, this will be all that the device can handle. However, when the legacy device contains a tag data path parallel to the image data path the (N-8) least significant bits can be sent to the tag data path. The separated image and tag data will be transmitted to a legacy device for printing.

At the legacy device, 104, the eight most significant bits of the original image data are bits of image data are halftoned as part of the normal printing process. The halftoner, 114, accepts the image data and uses a halftone pattern to generate a halftoned data stream, 122, which is used by the legacy device.

For example, the legacy device may print the image data as part of a reprographic process. The tag bits are used to select from one of $2^{N-8}$ 8-bit halftone patterns via the selector, 116. The selector chooses from one of the $2^{N-8}$ 8-bit halftone patterns, two of which are shown as 118 and 120. Each of these 8-bit halftone patterns can be generated from an N-bit halftone pattern; a halftone pattern designed for N-bit data.

The $2^{N-8}$ unique 8-bit halftones can be generated from the N-bit halftone by the mathematical operations:

$$HT8\_0 = \text{floor}(HTN + 2^{N-8} - 1)/2^{N-8}),$$

$$HT8\_1 = \text{floor}(HTN + 2^{N-8} - 2)/2^{N-8}),$$

$$HT8\_2 = \text{floor}(HTN + 2^{N-8} - 3)/2^{N-8}) \ldots,$$

$$HT8\_X = \text{floor}(HTN + 2^{N-8} - (X+1))/2^{N-8}).$$

where floor(x) is the standard floor operation which returns the largest integer $\leq x$.

For example, a 9-bit image path can be implemented by separating the least significant bit from the 9-bit image data and using the eight most significant bits as the image data. The least significant bit is then assigned to one of the tag states. This separated tag and image data is sent to the printer. At the printer end, the single tag bit is not combined with the image data, but instead the tag bit is used to select between two halftones.

If a 9-bit halftone is designed, it can be decomposed into two distinct 8-bit halftones. One of the halftones HT8_1 would contain the eight most significant bits of the 9-bit halftone and the other halftone HT8_0 would contain the eight most significant bits of the 9-bit halftone rounded up mathematically. That is the 8-bit halftones are obtained from the 9-bit halftone via the mathematical operations:

$$HT8\_0 = \text{floor}(HT9 + 1)/2)$$

and $$HT8\_1 = \text{floor}(HT9/2),$$

When the tag bit is a 1, the tag would be used to select halftone HT8_1. Similarly when the tag bit is a 0, the tag would be used to select halftone HT8_0. The unique level of 510 in the 9-bit halftone would be lost since it would convert to an 8-bit value of 255. This would not introduce a significant defect since the value of 510 is quite close to the maximum value of 512 for a 9-bit halftone.

The implementation described in FIG. 1 has the advantage of being backwards compatible with the legacy 8-bit systems.

All of the HT8_X are valid 8-bit halftones and any could be used in an 8-bit system since the 8-bit halftones are just quantized versions of the full N-bit halftone HTN. A legacy system could process the image data and ignore the tag bits without any impact, although not gaining the full advantage of the extra information contained in the tag bits.

However in legacy systems with separate image data and tag data streams, it is common for the data to be compressed after being generated and before being processed for printing. When sending data to a legacy machine that uses compression on the image and tag data streams, the implementation of FIG. 1 can be modified by compressing each data stream from the image generation source, 102. The tag data is compressed using a lossless compression algorithm to ensure that the information in the tag data is preserved. The image data is typically compressed using a lossy algorithm since a small loss of image data is acceptable.

However, since the pseudo tag data is generated from the least significant bits of the original N-bit image data it will tend to have many transitions which will seriously impact the level of compression achievable if lossless compression is applied it. The high level of transitions will impact the amount of compression available for the tag data stream compared to a normal tag data stream.

Figure 2:
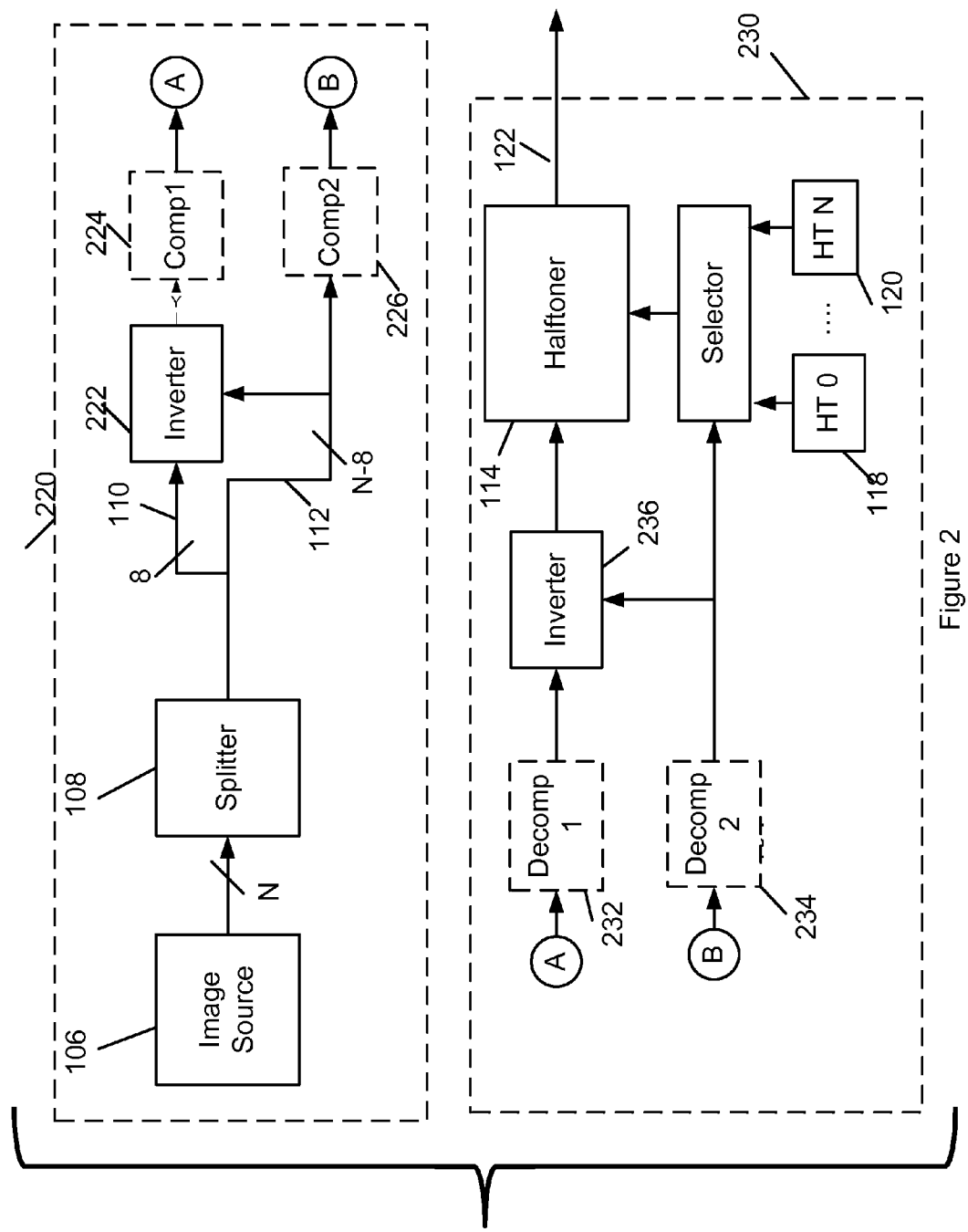
FIG. 2 illustrated a second apparatus for converting N-bit image data into 8-bit image and $2^{N-8}$ bit tag data.

FIG. 2 shows an implementation including compression that avoids compression problems in the separated tag data stream. In the implementation of FIG. 2, the most significant bits of the image data are encoded into the tag plane. Since the most significant bits of the image do not usually change rapidly, the tag data so generated can compress well using a lossless algorithm. The implementation of FIG. 2 has the most significant bits of the image sent to the tag plane and the eight least significant bits are sent to the image plane.

The system illustrated in FIG. 2 begins by splitting the N-bit data stream into an image data stream and a tag data stream at the image source 220. As in FIG. 1, the data from the image source 106 is split by splitter 108 into two data streams 110 and 112, where the eight least significant bits are used as the image data stream 110 and the N-8 most significant bits are to be used as the tag data stream 112.

The implementation of FIG. 2 includes an inverter 222. The inverter 222 is controlled by the tag data 112, and inverts the data at its input whenever the tag data is odd. The inverter 222 is used to modify the data stream to properly handle transitions that occur when values of the data stream cross a level that is a power of 2≥256.

For example, the case of a 9-bit system; 9-bit image values that are close to each other get mapped to very different 8-bit image data values. Consider the case of image data pixels with values of 254 and 256. The image data pixel of value 254 will have a tag value of 0 and an 8-bit image value of 254, while the image data pixel of value 256 will have a tag value of 1 and an 8-bit image value of 0.

Such a large swing in image values will result in large losses when compressed. This can result in lost levels and the introduction of image artifacts in a case where the original image is smooth and slowly varying.

By inverting the data in the case where the tag bit value is 1, adjacent image values in the N-bit data stream are mapped into adjacent values in the separated image data stream. This inversion is performed in inverter module 202, at the same time as the inversion takes place. The inversion results in a type of grayscale coding of the image data. The compression is thus not presented with large swings in the image data near the transitions between even tag values and odd tag values of 1.

FIG. 3 shows a table of image values for a 12-bit image source. Column 1, indicated by 302, shows the decimal representation of an image pixel from the 12-bit image source. The corresponding entry in column 2, indicated by 304, shows the hexadecimal equivalent of the decimal value in column 1. Column 3, indicated by 306, shows the 8-bit output of the inverter for each of the entries. The transitions at three multiples of 256 are shown. The values at the transition at image value 256 are shown in the rows preceding and following the row indicated by 308. Similarly the transition at image value 512 is shown in the rows preceding and following the row indicated by 310 and the transition at 1024 is shown in the rows preceding and following the row indicated by 312.

At each transition, the values output by the inverter follow smoothly and continuously; there are no sudden jumps. For example, the values at the transition near row 308 shows that the output values go from 0xFF for an input of 255 and the output for an input of 256 is also 0xFE. As the input values increase, the output values decrease until near the transition at 512, near row 310, when the values do not jump at the transition, but begin to increase for input values between 512 and 1024. This alternation continues at each transition that is a multiple of 256.

The inversion module performs one other function. Consider, for example, the case of a 9-bit system where the input 9-bit image data value is 255; the most significant bit is 0, which is used in the tag plane, and the 8-bit image data value will be 255. When the value of 255 is halftoned, the output will be "ON" which is not desired in this case since 255 is only half of the maximum value. In order to eliminate this problem, the value of 255 must be separately processed. A solution is to remap all 9-bit image values of 255 to 254 for any tags using HT8_0. This remapping is performed in the inverter 222. The remapping can be implemented as a lookup table or as part of a more extensive tone curve module.

The inverted image data stream is then optionally compressed in compressor 224. The compression could use a lossy compression such as JPEG, or it could use a lossless compression. The lossy compression allows for a more compact compressed data stream where the level of defects due to the compression can be controlled by choosing the proper conversion parameters. The tag data stream is optionally compressed in compressor 226. Compressor 226 uses a lossless compression algorithm so that the information in the tag data stream is preserved unmodified.

At the receiving device, 230, the incoming data streams are first decompressed if the incoming data is compressed. Decompressor 232 decompresses the image data stream and decompressor 234 decompresses the tag data stream. Thus, decompressor 232 and decompressor 234 can be optional components.

The image data stream is passed through inverter 236. Inverter 236 inverts the data at its input whenever the corresponding tag data is odd. The image data is inverted before halftoning in inverter 236 to restore the desired video.

An alternative implementation not using the inversion modules would be to gray code the 9-bit image data so that there are no sudden transitions. In such a case, the inversion module 222 is replaced by a gray coding module, while the inversion module 236 performs a conversion of the input gray code back to the original coding.

The image data stream is then passed to the halftoner 114, as in the implementation of FIG. 1. The particular halftone to be used is controlled by the value of the tag data stream which is input to selector 116. Selector 116 chooses from one of the halftone patterns two of which are shown as 118 and 120.

Alternatively, the inversion might be performed by the source of the N-bit data, such as a Postscript RIP engine. No change to the interface between the data source and the printer is needed and current 8-bit image paths can be used. This architecture has the advantage that it can be used in systems without compression and is backwards compatible with 8-bit image sources and is robust to any further image processing.

For the implementation of FIG. 2 the 8-bit halftones to be used must be derived from the N-bit halftone in a different manner from the process used for the FIG. 1 implementation. The $2^{N-8}$ 8-bit halftones are generated from the N-bit halftone by the operations:

$HT8\_0 = \min(HTN, 255)$, $HT8\_1 = \min(\max(0, htn-256), 255)$, $HT8\_2 = \min(\max(0, HTN-512), 255)$, and $HT8\_X = \min(\max(0, HTN-256*X), 255)$.

As an example, in generating data from a 9-bit image source, the most significant bit is used as the tag bit and the eight least significant bits are used as the image data. The two halftones HT8_0 and HT8_1 are generated from the 9-bit halftone HT9 by a thresholding operation.

HT8_0 which is used when the most significant bit is 0, meaning that the value of the 9-bit image data is less than or equal to 255, is generated by using only the threshold values in HT9 that are less than or equal to 255 and setting all other thresholds in HT8_0 to 255. The second halftone HT8_1 is created by setting all thresholds less than or equal to 255 to 0 and setting all other thresholds to HT9-256. Mathematically:

$HT8\_0 = \min(HT9, 255)$ and $HT8\_1 = \max(0, HT9-256)$.

Figure 4:
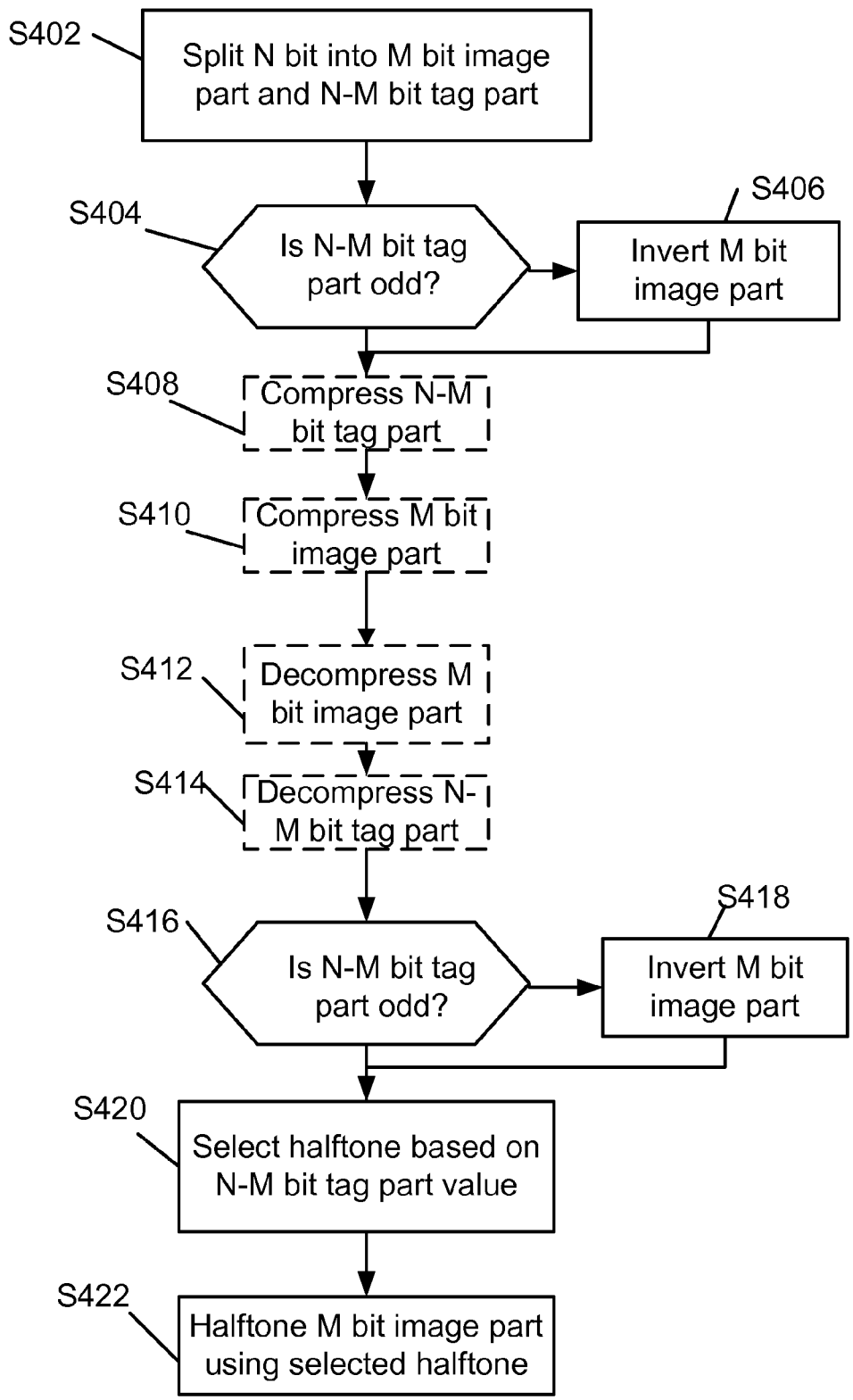
FIG. 4 shows a flowchart method for converting N-bit image data into 8-bit image and $2^{N-8}$ bit tag data.

FIG. 4 shows a method by which a high bit depth stream of data can be modified to allow its use by a lower bit depth device. Steps S402 through S410 are considered to be an encoding phase of the method, while steps S412 through S420 are considered to be a decoding phase of the method.

In S402, the incoming N-bit image data words are split into an M-bit image part and an N-M bit tag part. In step S404, a check is made to see if the N-M tag part is odd. If so, in S408, the M bit image part is inverted. In S408, the M-bit image part can be optionally compressed, and in S410, the N-M bit tag part can be optionally compressed.

The compression methods could be the same for each part or different compression methods can be used in S408 and S410. For example, in S408, a lossy compression algorithm could be applied to the M-bit image part, while in S410, a lossless algorithm could be used to compress the N-M bit tag part.

The decoding phase optionally begins in S412 where the compressed M-bit image part is uncompressed. Optionally, in S414, the compressed N-M bit tag part is decompressed. In S416, a check is made to see if the N-M bit tag part is odd; if so, in S418, the M-bit image part is inverted.

In step S420, a halftone is selected based on the value of the N-M bit tag part. Finally in S422, the re-inverted image is halftoned.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus for achieving higher bit depth in a tagged image data path, comprising:
    a source of a stream of N-bit digital image data words;
    a splitter to separate the stream of N-bit digital image data words into a M-bit video word stream and an N-M bit tag word stream;
    a first inverter, accepting the M-bit video word stream, to invert a sense of a word of the M-bit video word stream whenever a corresponding tag word is odd, thereby generating a modified video word stream;
    a second inverter to invert a sense of a word of the modified video word stream whenever a corresponding tag word is odd; and
    a halftoner, operatively connected to the inverter, to generate a halftoned data stream from the modified video word stream;
    said halftoner selecting from one of $2^{N-M}$ halftone patterns based on values of the tag word stream.

2. The apparatus as claimed in claim 1, further comprising:
    a first compressor to compress the modified video word stream;
    a second compressor to compress the tag word stream;
    a first decompressor to decompress the compressed modified video word stream; and
    a second decompressor to decompress the compressed tag word stream.

3. The apparatus as claimed in claim 1, wherein the halftone patterns are selected based upon the value of a tag word is odd.

4. The apparatus as claimed in claim 1, wherein the M-bit video stream is selected from the M least significant bits of the N-bit data stream.

5. The apparatus as claimed in claim 1, wherein the M-bit video stream is selected from the M most significant bits of the N-bit data stream.

6. The apparatus as claimed in claim 1, further comprising:
    a gray coder to gray code the stream of N-bit digital image data words;
    said splitter separating the gray coded stream of N-bit digital image data words into a M-bit video word stream and an N-M bit tag word stream.

7. The apparatus as claimed in claim 1, further comprising:
    a gray coder to gray code the stream of N-bit digital image data words;
    said splitter separating the gray coded stream of N-bit digital image data words into a M-bit video word stream and an N-M bit tag word stream;
    a first compressor to compress the modified video word stream;
    a second compressor to compress the tag word stream;
    a first decompressor to decompress the compressed modified video word stream; and
    a second decompressor to decompress the compressed tag word stream.

8. A method for processing a stream of N-bit digital data words comprising:
    dividing the stream of N-bit digital data words into an M-bit image part and an N-M bit tag part;
    inverting each word of the M-bit image part when the corresponding N-M bit tag part is odd; and halftoning the M-bit image part, the halftone being selected from one of 2N-M halftone patterns, the selection being based on the value of the N-M bit tag part.

9. The method as claimed in claim 8, further comprising:
compressing the M-bit image part and the N-M bit tag part; and
decompressing the compressed M-bit image part and the N-M bit tag part;
said halftoning being the halftoning of the decompressed M-bit image part and the selection being based on the value of the decompressed N-M bit tag part.

10. The method as claimed in claim 9, wherein separate compression methods are used for the M-bit image part and the N-M bit tag part.

11. The method as claimed in claim 9, further comprising storing the compressed M-bit image part and the compressed N-M bit tag part after compression.

12. The method as claimed in claim 9, further comprising processing the compressed M-bit image part after compression.

13. The method as claimed in claim 9, wherein the image data stream is compressed lossy.

14. The method as claimed in claim 9, wherein the tag data stream is compressed losslessly.

15. The method as claimed in claim 8, wherein the N-M tag bit part is chosen from the N-M least significant bits of the N-bit data stream.

16. The method as claimed in claim 8, wherein the N-M tag bit part is chosen from the N-M most significant bits of the N-bit data stream.

17. The method as claimed in claim 8, wherein the $2^{N-M}$ halftones are derived from a single N-bit halftone pattern.

\* \* \* \* \*